July 15, 1969　　　V. F. ANDERSON　　　3,455,605
PREFABRICATED PLASTIC CHAIR AND ASSEMBLY METHOD
Filed Oct. 23, 1967　　　　　　　　　　5 Sheets-Sheet 1
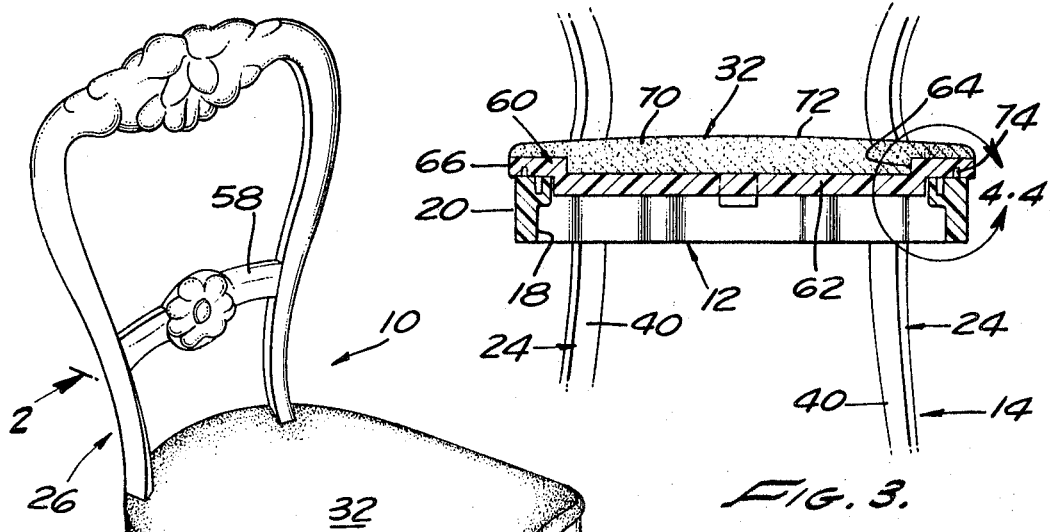
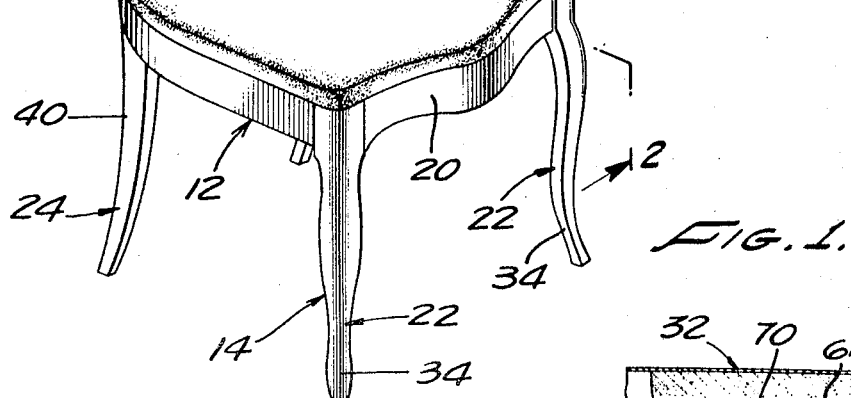
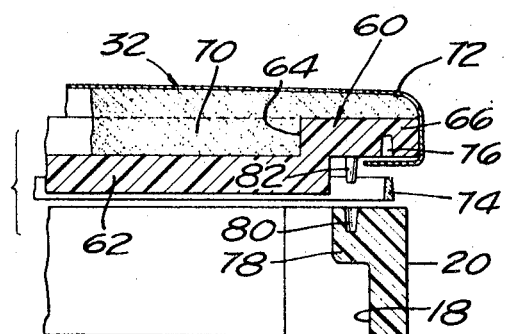
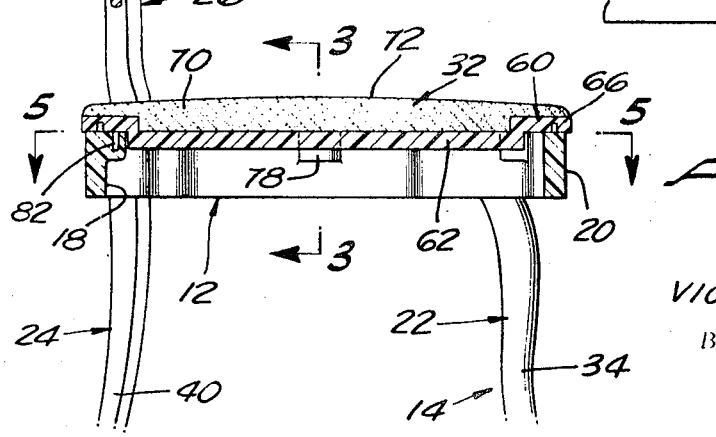
INVENTOR.
VICTOR F. ANDERSON
BY Beehler & Arant
ATTORNEYS

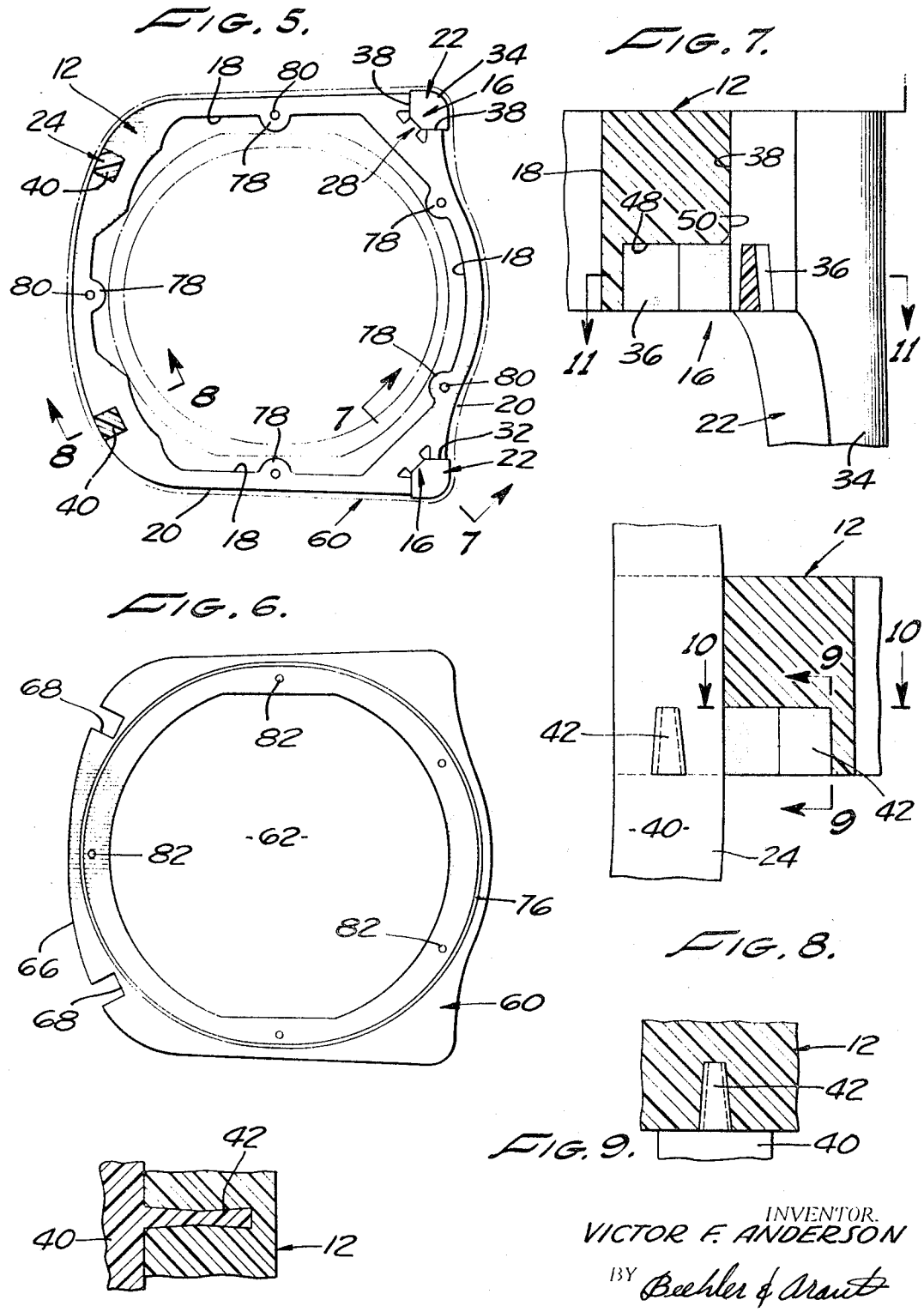

July 15, 1969  V. F. ANDERSON  3,455,605
PREFABRICATED PLASTIC CHAIR AND ASSEMBLY METHOD
Filed Oct. 23, 1967  5 Sheets-Sheet 3
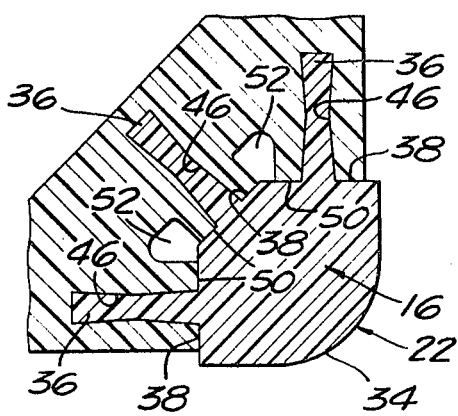
FIG. 11.
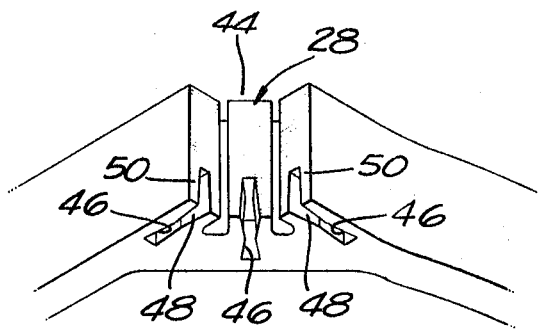
FIG. 12.
FIG. 13.
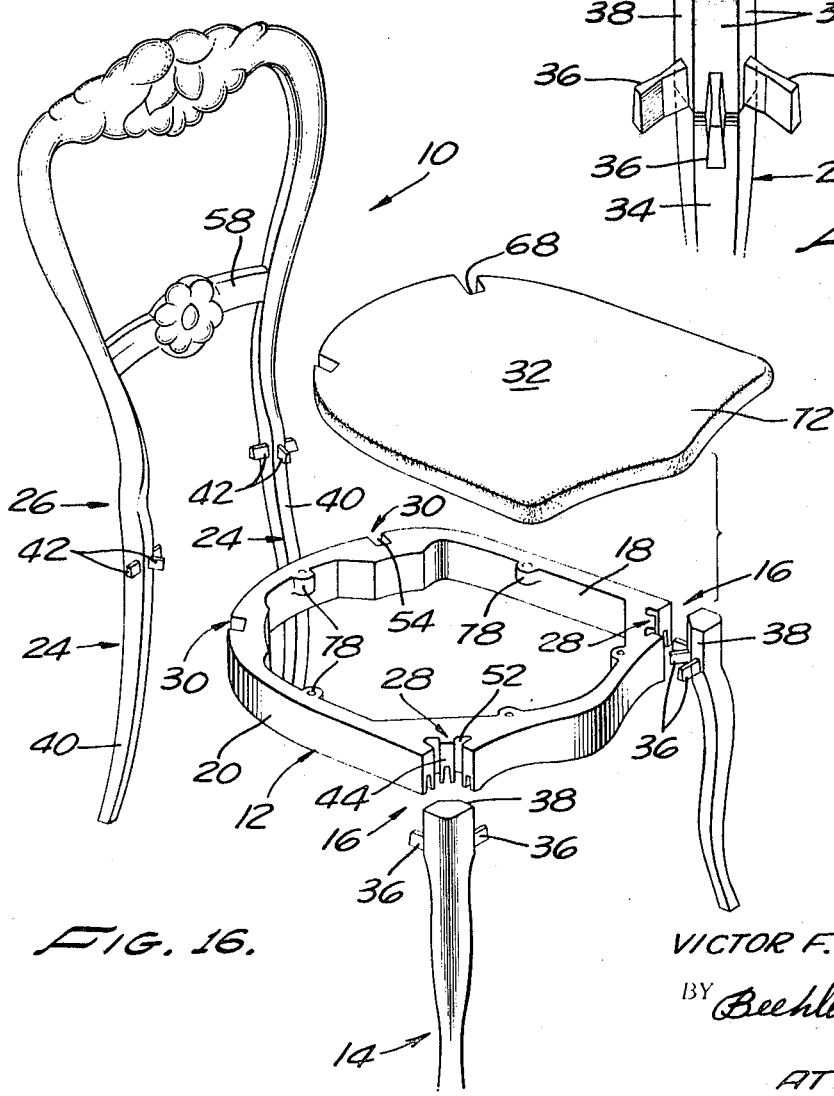
FIG. 16.
INVENTOR.
VICTOR F. ANDERSON
BY Beehler & Arant
ATTORNEYS INVENTOR.
VICTOR F. ANDERSON
BY Beehler & Arant
ATTORNEYS

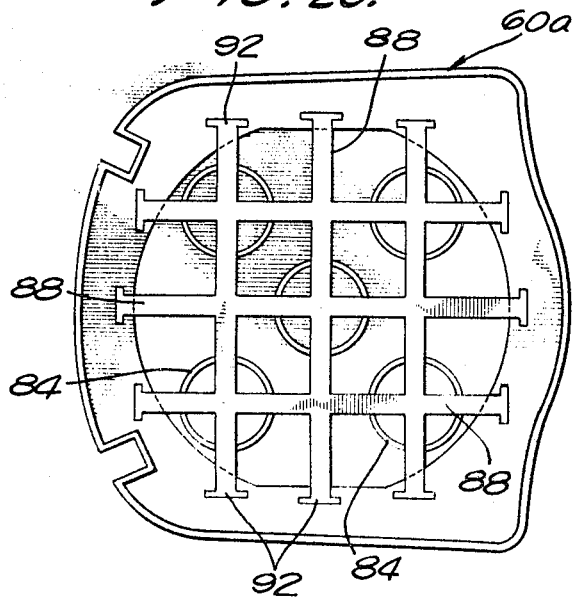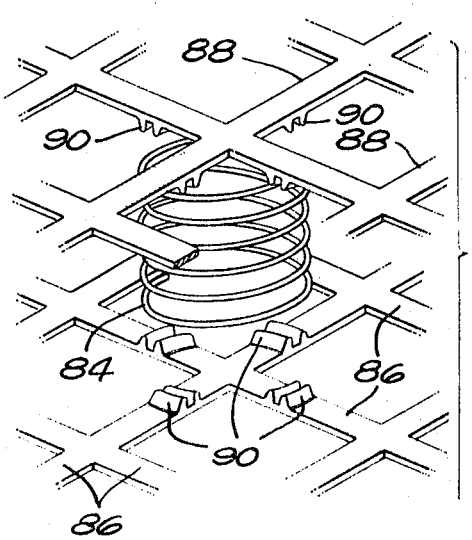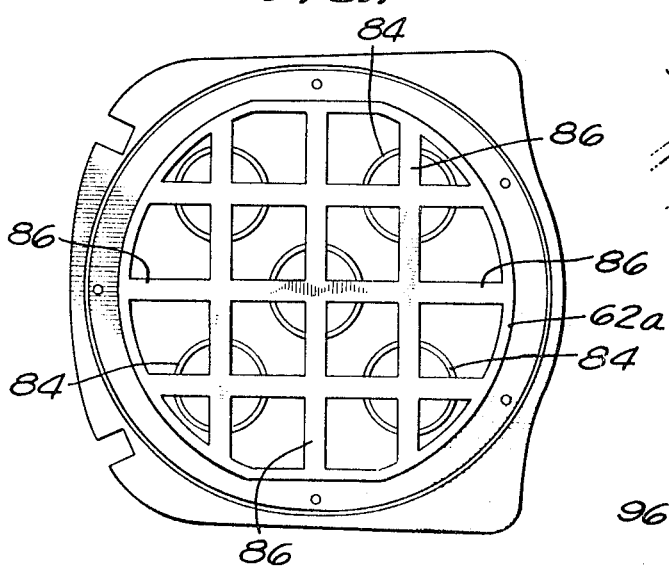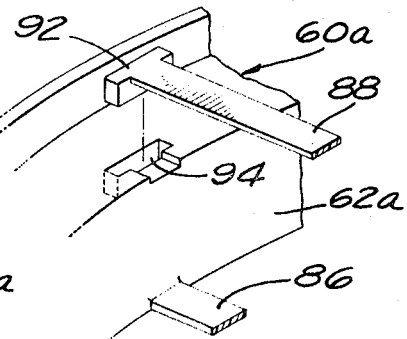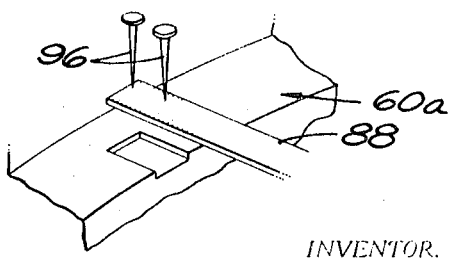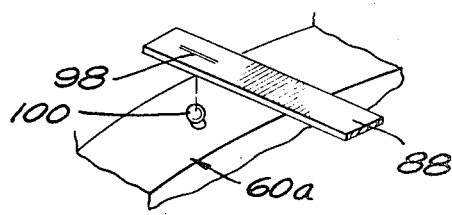

United States Patent Office 3,455,605
Patented July 15, 1969

3,455,605
PREFABRICATED PLASTIC CHAIR AND ASSEMBLY METHOD
Victor F. Anderson, Wenonah, N.J., assignor to Shell Oil Company, New York, N.Y., a corporation of Delaware
Filed Oct. 23, 1967, Ser. No. 677,153
Int. Cl. A47c 5/00
U.S. Cl. 297—445                                    11 Claims

ABSTRACT OF THE DISCLOSURE

An article of furniture, such as a chair or table, composed of a relatively few mating prefabricated parts including a main frame and supporting legs which may be injection molded from plastic or otherwise economically mass produced and then rapidly assembled by insertion of the legs into sockets in the frame in such a way that laterally projecting attachment lugs on the legs enter slots in the frame to firmly retain the parts in assembled relation and positively position the parts relative to one another, thus to permit permanent joining of the parts without the use of jigs, clamps, or the like.

BACKGROUND OF THE INVENTION

Field of the invention

This invention relates generally to furniture and more particularly to a novel article of furniture composed of a relatively few prefabricated parts which may be economically mass produced and then rapidly assembled and permanently joined without the aid of jigs, clamps, or the like, for retaining the parts in assembled relation.

As will appear from the ensuing description, the present invention may be utilized to mass produce, at relatively low cost, various articles of furniture, including chairs, tables, and the like, in a variety of styles. However, the invention is particularly suited to and will be disclosed in connection with the mass production of low cost, relatively ornate chairs.

Prior art

At the present state of development of the furniture manufacturing art, chairs, tables, and the like are commonly fabricated from wood and constructed in a multiplicity of separate pieces which are individually shaped by machine and then joined with glue, screws, or the like while the pieces are held in assembled relation with the aid of jigs or clamps. This method of fabrication is quite laborious and lends itself to only limited mass production techniques. As a consequence, the articles of furniture produced by the existing fabrication methods tend to be quite costly. The furniture costs increase appreciably, of course, in the event that the furniture is provided with any carving, scroll work, or other ornamental features.

SUMMARY OF THE INVENTION

The present invention seeks to overcome the above drawbacks of the existing methods of furniture fabrication. To this end, the invention provides an article of furniture composed of a relatively few number of simple parts which may be molded from plastic or otherwise economically mass produced and then rapidly assembled and permanently joined with little or no tooling so as to yield a completed furniture article at minimum cost. A highly important advantage of the invention resides in the fact that the invention may be utilized to produce a variety of furniture articles in various styles, including both relatively plain contemporary and relatively ornate provincial styles. According to a particularly unique and important feature of the invention, the legs of the present furniture article are provided with laterally projecting attachment lugs and the frame is formed with sockets for receiving the legs and their attachment lugs. The legs and sockets are so constructed and arranged that simple insertion of the legs into the sockets results in firm attachment of the legs to the furniture frame in a manner which positively positions the legs and frame relative to one another. This permits the frame and legs to be permanently joined without the aid of jigs, clamps, or other tooling for retaining the parts in assembled relation.

In connection with this permanent joining of the furniture parts, it should be noted that the preferred practice of the invention involves molding the prefabricated furniture parts from plastic and then permanently joining these parts by solvent welding, heat welding, or adhesive bonding. However, it will become evident as the description proceeds that the parts may be permanently joined in other ways, as by bolts, nails, or the like. In this regard, a unique advantage of the invention is that the molded parts may be provided with any degree of surface ornamentation and/or other ornamental features without appreciably adding to the overall cost of the completed furniture article. As a consequence, the present furniture article may be fabricated in a wide variety of styles, including both the contemporary and provincial styles mentioned earlier. Another important advantage of the invention is that it provides a minimum number of joints in the finished article of furniture. Accordingly, the furniture is characterized by maximum strength and rigidity, in addition to decorative appearance and low cost.

As noted earlier, while it may be applied to the manufacture of various articles of furniture, the invention will be disclosed herein in connection with its application to chairs. In this regard, a further feature of the invention is concerned with a unique construction of the chair seat and method of attachment of the seat to the main furniture frame, or seat frame, as it is hereinafter referred to. According to this aspect of the invention, the seat may be upholstered and may, if desired, be provided with any suitable type of cushioning means, such as a seat cushion and/or springs.

BRIEF DESCRIPTION OF THE DRAWINGS

FIGURE 1 is a perspective view of a chair which has been constructed in accordance with the invention;
FIGURE 2 is a section taken on line 2—2 in FIGURE 1;
FIGURE 3 is a section taken on line 3—3 in FIGURE 2;
FIGURE 4 is an enlargement corresponding to the sectioned area enclosed by the circular arrow 4—4 in FIGURE 3 and illustrates the manner of assembly of the chair seat on the seat frame;
FIGURE 5 is a section taken on the line 5—5 in FIGURE 2 showing the seat frame in top plan view;
FIGURE 6 is a bottom plan view of a seat cushion supporting panel which is adapted to be installed on the seat frame in FIGURE 5;
FIGURE 7 is an enlarged section taken on line 7—7 in FIGURE 5 through the seat frame and one front chair leg;
FIGURE 8 is an enlarged section taken on line 8—8 in FIGURE 5 through the seat frame and one rear chair leg;
FIGURE 9 is a section taken on line 9—9 in FIGURE 8;
FIGURE 10 is a section taken on line 10—10 in FIGURE 8;
FIGURE 11 is a section taken on line 11—11 in FIGURE 7 and showing, in particular, the mating or complementary configurations of the front chair leg and its receiving seat frame socket;
FIGURE 12 is a fragmentary perspective view of one front leg receiving socket in the seat frame;

FIGURE 13 is a fragmentary perspective view of the upper end portion of a front chair leg which fits within and mates with the seat frame socket illustrated in FIGURE 12;

FIGURE 16 is an exploded perspective view of the completed chair;

FIGURE 20 is a section taken on line 20—20 in FIGURE 18;

FIGURE 21 is a view of the underside of the chair seat and frame of the chair illustrated in FIGURE 17;

FIGURE 22 is an enlarged fragmentary perspective view of a seat cushion spring and spring positioning and retaining straps embodied in the chair seat illustrated in FIGURES 20 and 21;

FIGURE 23 is an enlarged fragmentary perspective view illustrating the manner in which the upper spring straps in FIGURE 22 are anchored to the seat frame;

FIGURE 24 illustrates a modified method of attaching the upper spring straps to the seat frame; and FIGURE 25 illustrates yet another method of attaching the straps to the seat frame.

DESCRIPTION OF THE PREFERRED EMBODIMENTS

Figure 14:
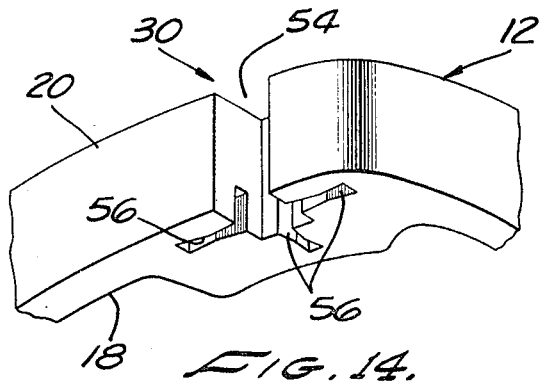
FIGURE 14 is a fragmentary perspective view of one rear chair leg receiving socket in the seat frame.

In general terms, the invention provides an article of furniture, represented in FIGURES 1 through 16 of the drawings by the chair 10, composed of a relatively small number of prefabricated parts including a frame 12 and supporting legs 14 circumferentially spaced about and depending below the frame. As will appear presently, the frame and legs may be mass produced in various ways but are preferably molded. It will be observed that each leg 14 includes a leg member proper and a number of frame attachment lugs projecting laterally, in outwardly diverging relation, from the leg member at seat level. The frame 12 is formed with receiving sockets 20 for the legs 14. These sockets enter the undersurface of and extend upwardly through the frame. As may be readily observed in the drawings, each leg socket 20 has a central socket portion and socket slots, equal in number to the attachment lugs on its respective leg 14, extending laterally from the central socket portion in outwardly diverging relation to one another. The central portion and slots of each leg socket are shaped and dimensioned to receive with a snug mating fit the leg member and attachment lugs of the corresponding supporting leg 14. At least the slots of each socket are closed by the upper walls, as shown.

The frame 12 and supporting legs 14 are assembled by initially longitudinally aligning the legs with their respective receiving sockets 16 and then relatively moving the frame and legs toward one another in the longitudinal directions of the legs to cause the attachment lugs on the legs to enter their respective socket slots through the lower open sides of these slots to positions wherein the legs bottom against the upper slot walls. The snug mating fit of the legs 14 in the sockets 16 is effective to firmly retain the legs and frame in assembled relation and to positively position the legs and frame relative to one another in such a way as to permit permanent joining of the parts without the aid of jigs, clamps, or other tooling of this character. The frame and legs may be joined by any convenient means, such as fasteners or an adhesive bonding agent. According to to the preferred practice of the invention, however, the legs and frame are molded from plastic and are joined by solvent or heat welding their abutting surfaces to one another. The legs 14 and leg sockets 16, and particularly the attachment lugs on the legs and the lug receiving socket slots, are constructed and arranged to maintain these abutting surfaces in firm adhesive bonding contact with one another without the use of auxiliary clamping means.

Referring now in more detail to the drawings, the article of furniture 10 of the invention which has been selected for illustration is a chair of provincial design. In this instance, the furniture frame 12 is a seat frame in the form of a generally annular frame member having inner and outer circumferential surfaces 18, 20. The frame has a rounded rear portion and front corner portions. The supporting legs 14 include a pair of front legs 22 and a pair of rear legs 24. Rear legs 24 form part of a back frame 26. The leg receiving sockets 16 in the seat frame 12 include a pair of front sockets 28 for receiving the front chair legs 22 and a pair of rear sockets 30 for receiving the rear legs 24. Front sockets 28 are located at the front corner portions, respectively, of the seat frame 12, and the rear sockets 30 are located along the rear curved portion of the seat frame. As shown best in FIGURES 5 and 16, the seat frame 12 is increased in thickness in the region of the sockets 28, 30 to provide the frame with the requisite strength and rigidity. Extending across and secured to the seat frame 12 is a seat assembly 32.

The front chair legs 22 are identical and, as already noted, each includes a leg member 34 and frame attachment lugs 36. At its upper seat level end, each front leg member 34 has a generally polygonal shape in transverse cross section which provides the leg member with three intersecting faces 38 disposed in longitudinal planes of the leg member inclined approximately at 45 degrees relative to one another. In this instance, each front leg has three attachment lugs 36 which are located along the longitudinal center lines of and project normal to the three leg faces 38, respectively. Accordingly, the lugs diverge outwardly at approximately 45 degrees relative to one another. As shown best in FIGURE 11, each attachment lug 36 has inner and outer end portions with tapered side faces which converge in the direction of the central juncture of the end portions. The side faces of the lugs are also vertically tapered so that these faces converge in the upward direction, as shown in FIGS. 7 and 8.

Figure 15:
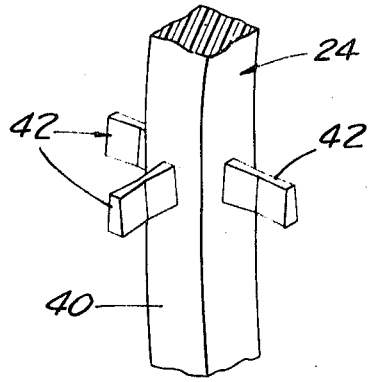
FIGURE 15 is a fragmentary perspective view of the portion of one rear chair leg which fits within and mates with the seat frame socket illustrated in FIGURE 14.
Figure 17:
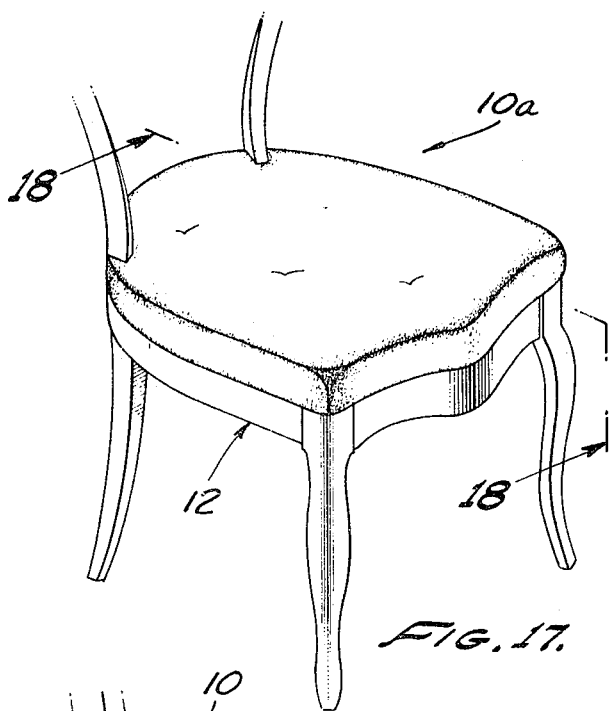
FIGURE 17 is a fragmentary perspective view of a modified and upholstered chair according to the invention.
Figure 19:
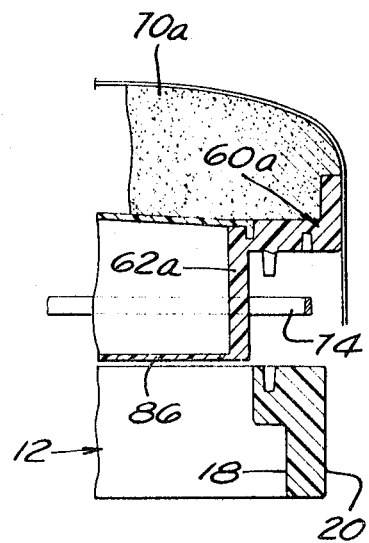
FIGURE 19 is an enlargement of the sectioned area encircled by the arrow 19—19 in FIGURE 18 and illustrates the manner of assembly of the upholstered seat on the seat frame of the chair in FIGURE 17.
Figure 18:
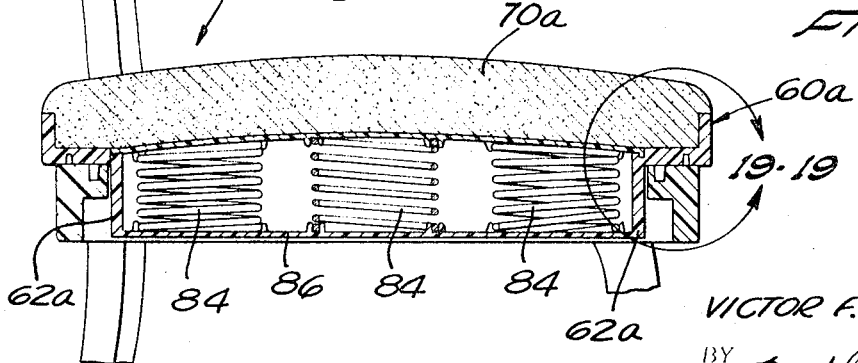
FIGURE 18 is an enlarged section taken on line 18—18 in FIGURE 17.

The rear chair legs 24 have leg members 40 which are contoured, as shown. Each rear leg member has a generally rectangular shape in transverse cross-section and mounts three frame attachment lugs 42 which project from the front and two side faces, respectively, of the member. Referring to FIGURE 15, it will be observed that the rear leg lugs 42 are tapered in the same fashion as the front leg lugs 36.

As shown best in FIGURES 11, 12 and 16, the front leg sockets 28 are formed in the front corner portions of the seat frame 12. Each front socket includes a central socket portion 44 and socket slots 46 extending laterally from and opening at their inner ends to the central socket portion. In this instance, the central portion 44 of each front leg socket opens longitudinally through the upper and lower surfaces of the seat frame 12 and laterally through the outer circumferential surface 20 of the frame, in a generally diagonal direction of the frame. The socket slots 46, on the other hand, open through the undersurface of the frame but are closed at their tops by upper walls 48. The central portion 44 of each front leg socket 28 is shaped in transverse cross-section to generally complement the contained, upper seat level portion of the corresponding front leg member 34. In this regard, it will be observed that each front leg socket has three longitudinal faces 50 which are disposed to abut the three faces 38 on the corresponding front leg member 34. The inner ends of the socket slots 46 open centrally through these socket faces, as shown. The seat frame 12 is recessed in the regions between the socket faces 50, as at 52, to lend a degree of lateral resiliency to the adjacent ends of the walls of the socket slots 46. The socket slots 46 are tapered to complement and receive with a snug mating or wedging fit the leg attachment lugs 36.

It is evident at this point that the upper ends of the front chair legs 22 and the seat frame front leg sockets 28 are shaped to permit mating engagement of the legs with the seat frame 12 by first locating the legs in longitudinal alignment with the normally lower ends of the seat frame front leg sockets 28 and then effecting relative movement of the seat frame and legs toward one another, in the longitudinal directions of the legs, in such a way as to cause the legs to enter the sockets from below. During this assembly procedure, the upper polygonal ends of the front leg members 34 enter the central front leg socket portions 44 and the front leg attachment lugs enter the socket slots 36. The legs are inserted into the sockets to final positions of assembly wherein the lugs bottom against the normally upper socket walls 48. In this final position of assembly, the front leg faces 38 abut and seat flush against the seat frame socket faces 50, in the manner best illustrated in FIGURE 11. The front leg attachment lugs 36 are dimensioned to have a snug fit within their respective seat frame socket slots 46. Moreover, because of the illustrated, longitudinally tapered shapes of the lugs and slots, the lugs are restrained against longitudinal movement in the slots. As a consequence, assembly of the seat frame 12 and front chair legs 22 in the manner just explained is effective to firmly secure the frame and legs to one another and to positively position the frame and legs relative to one another. In this regard it is significant to note that the three attachment lugs 36 of each front leg 22 and their respective socket slots 46 extend in the fore and aft, lateral, and diagonal directions, respectively, of the seat frame to aid the positive positioning function of the lugs and slots. In the final position of assembly of the seat frame 12 and front legs 22, the upper ends of the legs are substantially flush with the upper surface of the frame. The exposed surface of the upper end of each leg is rounded, in the manner illustrated in FIGURE 11, so that the leg protrudes slightly beyond the outer surface 20 of the frame.

Referring to FIGURE 14, it will be seen that the rear leg sockets 30 in the seat frame 12 are generally similar to the front leg sockets 28 in that the rear sockets have central socket portions 54 and slots 56 extending laterally from and opening inwardly to the central socket portions. The central socket portions 54 open longitudinally through the upper and lower surfaces of the seat frame 12 and laterally through the rear rounded portion of the outer seat frame surface 20. These socket portions are generally rectangular in transverse cross-section so as to complement the rectangular cross-sections of the rear leg members 40. Similarly, the rear leg socket slots 56 have the same tapered shape as the rear leg attachment lugs 42 and are dimensioned to receive these lugs wtih a snug mating fit. The three slots 56 of each rear leg socket extend in the lateral and fore and aft directions, respectively, of the seat frame 12.

The seat frame 12 and the rear chair legs 24 are assembled by first laterally inserting the rear leg members 40, just above their attachment lugs 42, into the central portions 54 of the rear leg sockets 30. The seat frame 12 and the rear legs 24 are then moved relative to one another in the longitudinal directions of these legs in such a way that the rear leg attachment lugs 42 enter the rear socket slots 56 from below to a position of final assembly wherein the lugs bottom against the upper walls of the slots. The rear legs, like the front legs, are designed to have a snug mating fit in their respective seat frame sockets 40, such that assembly of the seat frame and rear legs in the manner just explained is effective to firmly attach the legs to the frame and positively position the legs relative to the frame. Thus, the frame and rear legs, like the frame and front legs, may be premanently joined without the aid of jigs, clamping means, or other tooling for locating and holding the legs relative to the frame.

As shown best in FIGURE 16, the rear leg members 40 continue upwardly above seat level and curve inwardly toward and join one another at their upper extremities. Extending between and joining the rear leg members, at some elevation above seat level, is a cross member 58. In the particular chair which has been selected for illustration, the inturned upper extremities of the rear leg members and the cross member 58 are provided with ornamental surface features, as shown. The joined rear leg members 40 and the cross member 58 together constitute the back frame 26. The upper portion of this frame, above seat level, forms the back rest of the completed chair.

During fabrication of the chair 10, the seat frame 12, front legs 22, and back frame 26 are assembled in the manner heretofore explained and are then permanently joined. Permanent joinder of these parts may be accomplished in various ways. As noted earlier, however, the preferred practice of the invention involves molding of the seat frame, back frame, and front legs from plastic and then permanently joining these parts by solvent or heat welding. Solvent welding of the parts, of course, involves coating the mating surfaces of the chair legs 22, 24 and seat frame sockets 28, 30 with a suitable solvent prior to assembly to cause fusion of these surfaces after assembly. Thermo-welding of the parts, on the other hand, involves heating the mating leg and socket surfaces after assembly to a sufficiently high temperature to cause fusion of these surfaces. It is significant to note here that this phase of the chair fabrication involves the assembly of only four prefabricated parts.

Turning now to FIGURES 2 through 6, it will be observed that the chair seat assembly 32 has a main load supporting seat panel 60. A central circular portion 62 of this panel is offset downwardly to fit within the central opening in the seat frame 12. Central panel portion 62 defines a generally circular recess 64 in the upper surface of the panel and a flange 66 surrounding and bounding the recess. The outer perimeter of this panel has the same contour as the seat frame 12 but projects slightly beyond the outer frame surface 20, as shown. Entering the rear edge of the panel flange 66 are slots 68 for receiving the rear leg members 40. Bonded or otherwise secured to the upper surface of the seat panel 60 is a seat cushion 70. This seat cushion has a central circular portion which fits within and complements the seat panel recess 64 to provide an increased cushion thickness within the central region of the seat assembly. Stretched over the seat cushion 70 is a cover sheet 72 of plastic or other suitable material. The perimetrical edge portion of this sheet is folded about the edge and against the underside of the seat panel flange 66, in the manner best illustrated in FIGURE 4. The lower inturned edge of the sheet is maintained in position under the flange in any convenient way. In this instance, the sheet edge is secured to the flange by a tapered retaining ring 74. As will be explained presently, this retaining ring forces the sheet edge into a mating tapered groove 76 in the underside of the seat panel flange during installation of the seat assembly 32 on the seat frame 12, thus to secure the sheet to the flange with a gripping action. If desired, the retaining ring may be serrated or otherwise roughened to permit more effective gripping of the sheet between the ring and flange.

The seat assembly 32 is installed on the seat frame 12 by placing the assembly over the frame in such a way that the seat panel flange 66 rests on the upper edge of the frame and the central panel portion 62 projects downwardly into the central frame opening. This central portion of the seat panel is externally dimensioned to fit snugly within the central opening in the seat frame and, thereby, to locate the seat assembly relative to the seat frame. The seat assembly may be secured to the seat frame in various ways. For example, the seat panel 60 may be releasably secured to the seat frame by screws or other fasteners to permit removal of the seat assembly for repair or replacement. In the particular chair illustrated, on the other hand, the seat assembly 32 is permanently attached to the seat frame 12. To this end, the seat frame is provided with a number of internal bosses 78 having tapered sockets 80 entering their upper surfaces for receiving tapered pins 82 depending from the underside of the seat panel flange 66. The bosses 78 are integrally formed with the seat frame 12 and the pins 82 are integrally formed with the seat panel 60. The seat assembly 32 is secured to the seat frame 12 by adhesively bonding, solvent welding, or heat welding the seat panel pins 82 in their respective seat frame sockets 80.

Prior to installation of the seat assembly on the seat frame, the cover sheet retaining ring 74 is pressed into its receiving groove 76 to initially grip the edge of the seat cushion cover sheet 72. During installation of the seat assembly on the seat frame, the seat panel 60 is pressed firmly against the seat frame to force the retaining rings to its final cover sheet gripping position in the groove. It will be understood that the seat panel, like the seat frame 12, front legs 22, and back frame 26, is preferably molded from plastic.

Turning now to FIGURES 18 through 26, there is illustrated a modified chair 10a according to the invention. This modified chair is identical, in most respects, to the earlier described chair. Accordingly, corresponding parts of the two chairs are designated by the same reference numerals. The major difference between the two chairs resides in the fact that the seat panel 60a of the chair 10a is provided with a central opening bounded by a depending annular wall or flange 62a on the panel to accommodate coil springs 84. Extending across the underside of this seat panel opening are a number of mutually joined intersecting straps 86 which support and locate the lower ends of the springs. A number of mutually joined intersecting straps 88 extend across the upper side of the panel opening to locate the upper ends of the springs. Referring to FIGURE 22, it will be seen that the spring locating function of the seat panel straps 86, 88 is accomplished or aided by providing the confronting surfaces of these straps with raised spring locating ribs 90 which straddle the adjacent coils of the springs. In the particular chair illustrated, the lower straps 86 are integrally joined at their ends to the lower edge of the depending seat panel flange 62a. The upper straps 88, on the other hand, are formed separately from the seat panel 60a and are joined to the panel in any convenient way. The seat panel 60a and its lower spring supporting straps 86 may be molded from plastic as one integral part.

FIGURES 23 through 26, for example, illustrate three possible methods of anchoring the ends of the upper straps. In FIGURE 23, for example, the straps are formed with transverse ends 92 which fit within mating recesses 94 in the upper surface of the seat panel 60a, about its central opening. In FIGURE 24, the upper strap ends are secured by tacks 96 to the seat panel which is recessed, as shown, to receive the ends. In FIGURE 26, the ends of the upper straps are slit at 98 to receive headed fasteners 100 secured to the seat panel. The seat cushion 70a of the modified chair 10a is substantially thicker than that of the chair 10 and is centrally supported on the seat springs 84. The modified chair is otherwise identical and assembled in the same manner as the earlier chair of the invention.

It is now evident, therefore, that the invention provides a chair having a minimum number of prefabricated parts which may be mass produced, preferably by injection molding of the same from plastic, and readily assembled to form a completed chair of minimum cost. Moreover, the seat frame, front legs, and back frame may be formed with a variety of ornamental contours, surface features, and other ornamental features at a fraction of the cost required to provide the same features on conventional chairs. In this regard, it will be understood that while the invention has been disclosed in connection with a chair of provincial design, the invention may be embodied in a variety of other chair styles. It is also significant to recall here that the invention may be utilized to fabricate articles of furniture other than chairs, such as tables and the like. Moreover, the mating leg-seat frame socket fastening disclosed herein may obviously be employed for other purposes such as securing arm rests to the back frame and/or seat frame.

What is claimed as new in support of Letters Patent is:

1. An article of furniture comprising:
   a rigid integral frame,
   legs spaced circumferentially about and depending below said frame each including a leg member proper and at least one attachment lug projecting laterally from said leg member at frame level,
   said frame having a receiving socket for each leg entering the undersurface of said frame adjacent the circumference thereof and extending upwardly through said frame,
   each socket including a central socket portion generally complementing and receiving said leg member and a slot extending laterally from said socket portion and snugly receiving said attachment lug, and
   said socket portion opening longitudinally and said slot opening laterally to the underside of said frame, whereby said article may be assembled by initially longitudinally aligning said legs and their respective receiving sockets and thereafter relatively moving said frame and legs longitudinally of said legs to cause said attachment lug of each leg to enter its respective slot through the open side thereof.

2. An article of furniture according to claim 1 wherein:
   each said leg includes a number of said attachment lugs projecting laterally in outwardly diverging relation from the respective leg member at frame level, each said socket has an equal number of slots extending laterally in outwardly diverging relation from the corresponding central socket portion and snugly receiving the attachment lugs, respectively, of the corresponding leg, and
   the several slots of each said receiving socket open laterally to the underside of said frame, whereby said frame and legs may be assembled by longitudinally aligning said legs and their respective sockets and thereafter moving said frame and legs relative to one another in the longitudinal directions of said legs to cause the several attachment lugs of each leg to enter their respective socket slots through the lower open sides of the slots.

3. An article of furniture according to claim 2 wherein:
   said attachment lugs and slots are laterally tapered to provide a wedging fit of said lugs in their respective slots, and
   said attachment lugs and slots are longitudinally tapered to restrain said lugs against relative longitudinal movement in their respective slots.

4. An article of furniture according to claim 3 wherein:
   said legs and frame comprise integral molded plastic parts, respectively.

5. An article of furniture according to claim 1 wherein:
   said central portion of each said receiving socket opens laterally through the outer surface of said frame, thereby to permit lateral insertion of said leg members into their respective receiving socket portions.

6. A chair comprising:
   a rigid seat frame, legs spaced circumferentially about and depending below said frame each including a leg member proper and a number of attachment lugs projecting laterally from said leg member in outwardly diverging relation at seat level, said seat frame having a receiving socket for each leg member entering the undersurface of said frame adjacent the circumference thereof and extending upwardly through said frame, each socket including a central socket portion complementing and receiving the corresponding leg member and a number of slots extending laterally from the respective socket portion and snugly receiving the attachment lugs on the resepctive leg member, and said central socket portions opening longitudinally and said slots opening laterally through the underside of said frame, and at least said slots being closed at their tops by upper walls, whereby said frame and legs may be assembled by initially longitudinally aligning said legs and their respective receiving sockets and thereafter relatively moving said frame and legs longitudinally of said legs to cause said attachment lugs to enter their respective slots to final positions of assembly wherein said lugs bottom against said slot walls.

7. A chair according to claim 6 wherein:

said legs and seat frame comprise integral molded plastic parts, said attachment lugs and slots are laterally tapered to provide said lugs with a wedging fit in said slots, and said attachment lugs and slots are longitudinally tapered to restrain said lugs against relative longitudinal movement in said slots, whereby assembly of said frame and legs firmly secures said legs to said frame and positively locates said legs relative to said frame.

8. A chair according to claim 6 wherein:

said seat frame comprises an annular frame member having inner and outer circumferential surfaces, and said central socket portions opening laterally through one of said frame surfaces.

9. A chair according to claim 6 wherein:

said legs include a pair of front legs and a pair of rear legs, said front legs are located at the front corners of said seat frame, said rear legs are located along the rear edge of said seat frame and extend above and mutually join one another above said seat frame to form an integral back frame, and said central socket portions open laterally through the outer circumferential surface of said seat frame, whereby said leg members may be inserted laterally into their respective socket portions.

10. A chair according to claim 9 wherein:

said seat frame, front legs, and back frame each comprises an integral molded plastic part, said attachment lugs and slots are laterally tapered to provide said lugs with a wedging fit in their respective slots, and said attachment lugs and said slots are longitudinally tapered to restrain said lugs against longitudinal movement in their respective slots.

11. A chair according to claim 6 wherein:

said seat frame comprises an annular frame member, and a seat assembly overlying said seat frame including a seat panel secured to the upper edge of said seat frame, a seat cushion over said panel, a cover sheet stretched over said cushion and about the edges of said panel, said panel having a groove in its undersurface extending about said panel contiguous with the outer edge thereof, and a retaining ring engageable with the inturned edge of said cover sheet to force said sheet into said groove and thereby secure said cover sheet to said seat panel with a gripping action, and said seat frame engaging said ring and retaining said ring in said groove when said seat assembly is installed on said frame.

References Cited

UNITED STATES PATENTS

| | | | |
|---|---|---|---|
| 211,175 | 1/1879 | Newell | 297—445 |
| 1,711,959 | 5/1929 | Morin | 297—448 |
| 1,718,321 | 6/1929 | Vericel | 297—444 |
| 2,726,713 | 12/1955 | Turner | 297—447 X |
| 3,240,460 | 3/1966 | Petersen | 248—188.8 |
| 3,313,575 | 4/1967 | Clapp | 297—446 |
| 3,328,084 | 6/1967 | Whitener et al. | 297—445 |

CASMIR A. NUNBERG, Primary Examiner

U.S. Cl. X.R.

297—440, 452